United States Patent
Dean et al.

(10) Patent No.: US 8,171,034 B2
(45) Date of Patent: May 1, 2012

(54) METHODS AND APPARATUS FOR SERVING RELEVANT ADVERTISEMENTS

(75) Inventors: Jeffrey A. Dean, Menlo Park, CA (US); Georges R. Harik, Mountain View, CA (US); Paul Bucheit, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 0 days.

(21) Appl. No.: 12/729,054

(22) Filed: Mar. 22, 2010

(65) Prior Publication Data

US 2010/0174605 A1    Jul. 8, 2010

Related U.S. Application Data

(63) Continuation of application No. 10/314,427, filed on Dec. 6, 2002, now Pat. No. 7,716,161.

(60) Provisional application No. 60/413,536, filed on Sep. 24, 2002.

(51) Int. Cl.
  *G06F 17/30* (2006.01)
(52) U.S. Cl. ......... 707/748; 707/727; 707/769
(58) Field of Classification Search .......... 707/723–730, 707/709, 711, 716, 748, 769; 705/14.25, 705/14.49, 26.1; 709/219; 715/205
See application file for complete search history.

(56) References Cited

U.S. PATENT DOCUMENTS

| | | | | |
|---|---|---|---|---|
| 5,724,521 A | * | 3/1998 | Dedrick | 705/26.1 |
| 5,903,892 A | * | 5/1999 | Hoffert et al. | 707/716 |
| 5,948,061 A | * | 9/1999 | Merriman et al. | 709/219 |
| 6,122,647 A | * | 9/2000 | Horowitz et al. | 715/205 |
| 6,134,532 A | * | 10/2000 | Lazarus et al. | 705/14.25 |
| 6,253,198 B1 | * | 6/2001 | Perkins | 707/711 |
| 6,438,539 B1 | * | 8/2002 | Korolev et al. | 707/769 |
| 6,643,641 B1 | * | 11/2003 | Snyder | 707/709 |
| 6,804,659 B1 | * | 10/2004 | Graham et al. | 705/14.49 |

FOREIGN PATENT DOCUMENTS

| | | |
|---|---|---|
| JP | 11-039338 | 2/1999 |
| JP | 11-045278 | 2/1999 |
| JP | 2000-020536 | 1/2000 |
| JP | 2000-090109 | 3/2000 |
| JP | 2001-243256 | 9/2001 |
| JP | 2001-282808 | 10/2001 |
| JP | 2002-506256 | 2/2002 |
| JP | 2002-108924 | 4/2002 |

(Continued)

OTHER PUBLICATIONS

Translation of Board's Decision for Chinese Patent Application No. 03822749.5, mailed Dec. 10, 2010 (1 pg.).

(Continued)

*Primary Examiner* — Shahid Alam
(74) *Attorney, Agent, or Firm* — John C. Pokotylo; Straub & Pokotylo

(57) ABSTRACT

The relevance of advertisements to a user's interests is improved. In one implementation, the content of a web page is analyzed to determine a list of one or more topics associated with that web page. An advertisement is considered to be relevant to that web page if it is associated with keywords belonging to the list of one or more topics. One or more of these relevant advertisements may be provided for rendering in conjunction with the web page or related web pages.

9 Claims, 5 Drawing Sheets

FOREIGN PATENT DOCUMENTS

| JP | 2002-117049 | 4/2002 |
|---|---|---|
| JP | 2002-245061 | 8/2002 |
| WO | WO 99/45487 | 9/1999 |
| WO | 01/44992 A1 * | 6/2001 |

OTHER PUBLICATIONS

Translation of a Notice of Reasons for Rejection for Japanese Patent Application No. 2009-000344, mailed Mar. 8, 2011 (3 pgs.).

Examiner's Report for Australian Patent Application No. 2008201934, mailed Mar. 31, 2011 (2 pgs.).

FirstLaw Reply Brief for Invalidation Trial Against Korean Patent No. 797,401 (28 pgs.) (Filed May 25, 2010) with translation (14 pgs.).

FirstLaw Pre-Trial Material for Invalidation Trial Against Korean Patent No. 797,401 (43 pgs.) (Filed May 25, 2010) with translation (42 pgs.).

Appellant Pre-Trial Material for Invalidation Trial Against Korean Patent No. 797,401 (65 pgs.) (Filed May 25, 2010) with translation (26 pgs.).

Supplementary Reply Brief for Invalidation Trial Against Korean Patent No. 797,401 (23 pgs.) (Filed Jun. 16, 2010) with translation (9 pgs.).

Appellant Brief for Invalidation Trial Against Korean Patent No. 797,401 (10 pgs.) (with summarized English translation (4 pgs.)) (Filed Jun. 22, 2010).

Second Supplementary Brief for Invalidation Trial Against Korean Patent No. 797,401 (7pgs.) (Filed Jun. 28, 2010) with translation (4 pgs.).

Patent Court Fifth Division Decision for Invalidation Trial Against Korean Patent No. 797,401 (43 pgs.) (with summarized English translation (13 pgs.)) (Filed Jun. 30, 2010).

Trial Board's Decision for Invalidation Trial Against Korean Patent No. 797,401 (49 pgs.) (Filed Oct. 1, 2010) with translation (2 pgs.)

Notification of Reexamination for Chinese Patent Application No. 03822749.5, mailed Jun. 21, 2010 (5 pgs.) with translation (8 pgs.).

Notification of the First Office Action for Chinese Patent Application No. 201110054976.3, mailed Jan. 11, 2012 (5 pgs.) with translation (8 pgs.).

Final Notice of Rejection for Japanese Patent Application No. 2009-000344, mailed Feb. 21, 2012 (2 pgs.) with translation (2 pgs.).

* cited by examiner

Travels in Italy

The
restaurant...chianti...the...the...restaurant...the...chianti...the
...restaurant...the...the...

FIG. 5

METHODS AND APPARATUS FOR SERVING RELEVANT ADVERTISEMENTS

RELATED APPLICATION

This application is a continuation of U.S. patent application Ser. No. 10/314,427, titled "METHODS AND APPARATUS FOR SERVING RELEVANT ADVERTISEMENTS," filed on Dec. 6, 2002 now U.S. Pat. No. 7,716,161 and listing Jeffrey A. Dean, Georges R. Harik and Paul Buchheit as the inventors, which application claimed benefit under 35 U.S.C. §119(e)(1), to the filing date of provisional patent application Ser. No. 60/413,536, titled "METHODS AND APPARATUS FOR SERVING RELEVANT ADVERTISEMENTS", filed on Sep. 24, 2002 and listing Jeffrey A. Dean, Georges R. Harik and Paul Buchheit as the inventors, for any inventions disclosed in the manner provided by 35 U.S.C. §112, ¶1. The provisional and utility applications are expressly incorporated herein by reference.

BACKGROUND OF THE INVENTION

A. Field of the Invention

The present invention relates generally to advertising and, more particularly, to serving relevant advertisements by comparing advertisers' targeting criteria to the content of media on which the advertisements are to be published.

B. Description of Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. However, even with demographic studies and entirely reasonable assumptions about the typical audience of various media outlets, advertisers recognize that much of their ad budget is simply wasted because the target audience is not interested in the ad they are receiving.

Interactive media, such as the Internet, has the potential for better targeting of advertisements. For example, some websites provide an information search functionality that is based on query keywords entered by the user seeking information. This user query can be used as an indicator of the type of information of interest to the user. By comparing the user query to a list of keywords specified by an advertiser, it is possible to provide some form of targeted advertisements to these search service users. An example of such a system is the Adwords system offered by Google, Inc.

While systems such as Adwords have provided advertisers the ability to better target ads, their effectiveness is limited to sites where a user enters a search query to indicate their topic of interest. Most web pages, however, do not offer search functionality and for these pages it is difficult for advertisers to target their ads. As a result, often, the ads on non-search pages are of little value to the viewer of the page and are therefore viewed more as an annoyance than a source of useful information. Not surprisingly, these ads typically provide the advertiser with a lower return on investment than search-based ads, which are more targeted.

It would be useful, therefore, to have methods and apparatus for providing relevant ads for situations where a document is provided to an end user, but not in response to an express indication of a topic of interest by the end user (e.g., not responsive to the end user submitting a search query).

SUMMARY OF THE INVENTION

Systems and methods consistent with the present invention address this and other needs by identifying targeting information for an advertisement, analyzing the content of a target document to identify a list of one or more topics for the target document, comparing the targeting information to the list of topics to determine if a match exists, and determining that the advertisement is relevant to the target document if the match exists.

Additional aspects of the present invention are directed to computer systems and to computer-readable media having features relating to the foregoing aspects.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a sample target document.

DETAILED DESCRIPTION

The following detailed description of the invention refers to the accompanying drawings. The detailed description does not limit the invention. Instead, the scope of the invention is defined by the appended claims and equivalents.

The present invention involves methods and apparatus for determining advertisements that are relevant to a given document. In one implementation, the document is a web page and the advertisements are electronic files that are capable of being rendered on that web page. A set, such as a list, of topics corresponding to the web page is generated by analyzing the content of the web page. There are a variety of techniques by which this may be performed, one of which is by computing a term vector for the web page and selecting the top N terms from that vector. The list of topics is compared to target information associated with the advertisements (e.g., keywords specified for the advertisements) to determine which of the advertisements are relevant to the web page. Some or all of these relevant advertisements may then be associated with the web page so that they may be rendered (e.g., displayed) with the web page.

Those skilled in the art will recognize that many other implementations are possible, consistent with the present invention.

A. Environment and Architecture

Figure 1:
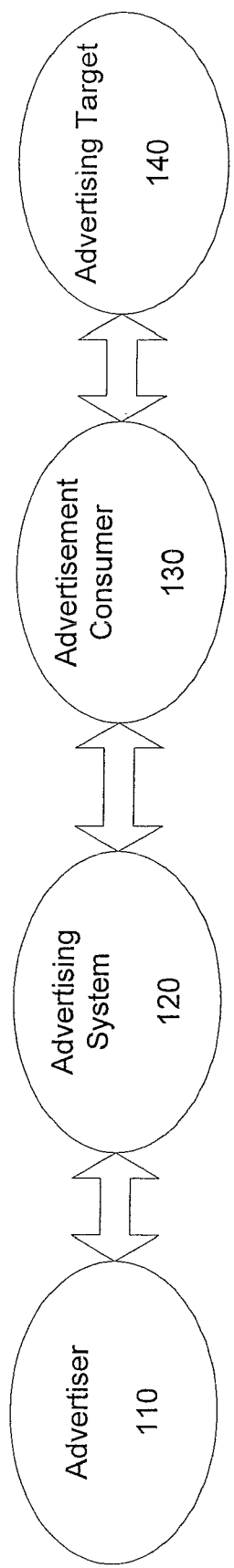
FIG. 1 is a diagram illustrating an environment within which the invention may be implemented.

FIG. 1 is a diagram illustrating an environment within which the invention may be implemented. The environment includes an advertiser 110, an advertising system 120, an advertisement consumer 130, and an advertising target 140.

Advertiser 110 may be the party that directly sells the goods or services being advertised (e.g., Amazon.com) or an agent authorized to act on the advertiser's behalf. The advertisement desired by advertiser 110 may exist in a variety of forms ranging from standard print advertisements, online advertisements, audio advertisements, audio/visual advertisements, or any other type of sensory message desired.

Advertising system 120 interfaces with both the advertiser 110 and the advertisement consumer 130. It may perform a variety of functions, as explained in more detail below in reference to FIG. 2. This invention may be used with such an advertising system 120.

Advertisement consumer 130 is the entity that will issue a request for advertisements to advertising system 120, obtain the advertisements from advertising system 120, and present the advertisement to the advertising target 140. Typically, the advertisement consumer is the entity that provides the content with which the advertisement is to be associated. In one implementation, the advertising consumer 130 is a search engine, such as that employed by Google, Inc. at www.google.com.

Advertising target 140 is the individual (or set of individuals) who ultimately receive the advertisement. In the case of visual advertisements, for example, the advertisement target 140 is the person who views the advertisement.

Figure 2:
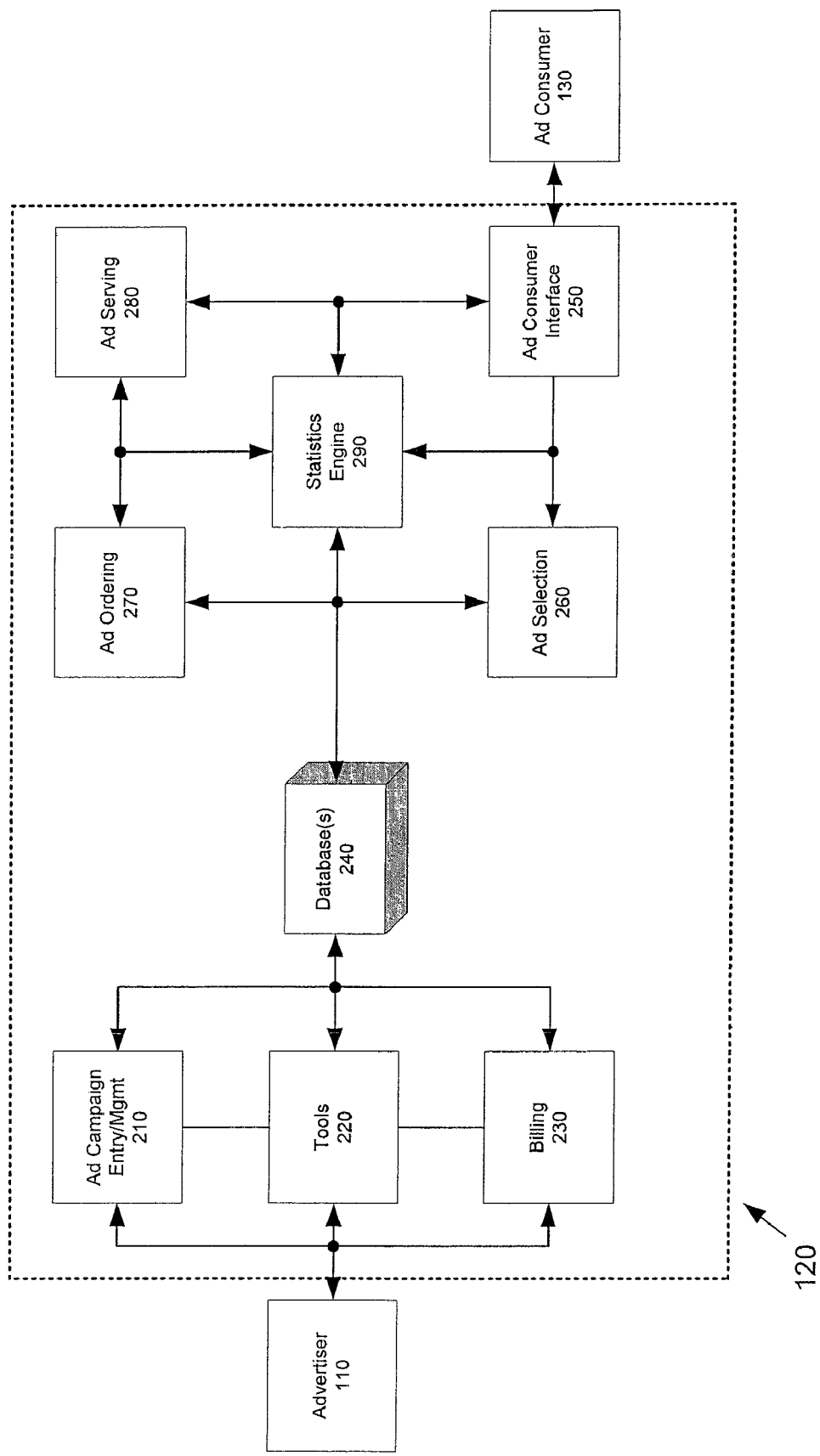
FIG. 2 is a diagram functionally illustrating an advertising system consistent with the invention.

FIG. 2 is a diagram functionally illustrating an advertising system consistent with the invention. The system includes an ad campaign entry and management component 210, a tools component 220, a billing component 230, one or more databases 240, an ad consumer interface component 250, an ad selection component 260, an ad ordering component 270, an ad serving component 280, and a statistics engine component 290. If the present invention is to be used with such an advertising system, it will primarily concern ad selection component 260. To help understand the invention, other components of the advertising system will be explained below. Furthermore, although FIG. 2 shows a particular arrangement of components constituting advertisement system 120, those skilled in the art will recognize that not all components need be arranged as shown, not all components are required, and that other components may be added to, or replace, those shown.

Ad entry and management component 210 is the component by which the advertiser enters information required for an advertising campaign and manages the campaign. An ad campaign contains one or more advertisements that are related in some manner. For example, the Ford Motor Company may have an ad campaign for zero percent financing, which could contain a series of advertisements related to that topic. Among the other things that could be provided by an advertiser through ad entry and management component 210 are the following: one or more advertising creatives (simply referred to as "ads" or "advertisements"), one or more set of keywords or topics associated with those creatives (which may be used as targeting information for the ads), geographic targeting information, a value indication for the advertisement, start date, end date, etc. The data required for, or obtained by, ad entry and management component 210 resides in one of the databases 240.

Tools component 220 contains a variety of tools designed to help the advertiser 110 create, monitor, and manage its campaigns. For example, tools component 220 may contain a tool for helping advertiser 110 estimate the number of impressions an ad will receive for a particular keyword or topic. Similarly, tools component 220 may be used to help advertiser 110 generate a list of keywords or topics for a given advertisement, or to generate additional keywords or topics based on representative ones supplied by advertiser 110. Other possible tools may be provided as well. Depending on the nature of the tool, one or more databases 240 may be used to gather or store information.

Billing component 230 helps perform billing-related functions. For example, billing component 230 generates invoices for a particular advertiser 110 or ad campaign. In addition, billing component 230 may be used by advertiser 110 to monitor the amount being expended for its various campaigns. The data required for, or obtained by, billing component 230 resides in a database 240.

Databases 240 contain a variety of data used by advertising system 120. In addition to the information mentioned above in reference to ad entry and management system 210, databases 240 may contain statistical information about what ads have been shown, how often they have been shown, the number of times they have been selected, who has selected those ads, how often display of the ad has led to consummation of a transaction, etc. Although the databases 240 are shown in FIG. 2 as one unit, one of ordinary skill in the art will recognize that multiple databases may be employed for gathering and storing information used in advertising system 120.

Ad consumer interface 250 is a component that interfaces with ad consumer 130 to obtain or send information. For example, ad consumer 130 may send a request for one or more advertisements to ad consumer interface 250. The request may include information such as the site requesting the advertisement, any information available to aid in selecting the advertisement, the number of ads requested, etc. In response, ad consumer interface 250 may provide one or more advertisements to ad consumer 130. In addition, ad consumer 130 may send information about the performance of the advertisement back to the ad system via the ad consumer interface 250. This may include, for example, the statistical information described above in reference to a database 240. The data required for, or obtained by, ad consumer interface component 250 resides in a database 240.

Ad selection component 260 receives a request for a specified number of advertisements, coupled with information to help select the appropriate advertisements. This information may include, for example, a search query specified by an end user. Alternatively, or in addition, as described in more detail below, this information may include data related to the content of the page for which the advertisements are being requested.

Ad ordering component 270 receives a list of relevant ads from ad selection component 260 and determines a preference order in which they should be rendered to an end user. For example, relevant ads may be ordered based on the value indication associated with each ad. These ordered ads may be provided to an ad serving component 280.

Ad serving component 280 receives an ordered list of ads from ad ordering component 270, and formats that list into a manner suitable for presenting to ad consumer 130. This may involve, for example, rendering the ads into hypertext markup language (HTML), into a proprietary data format, etc.

Statistics engine 290 contains information pertaining to the selection and performance of advertisements. For example, statistics engine 290 may log the information provided by ad consumer 130 as part of an ad request, the ads selected for that request by ad selection component 260, the order selected by ad ordering component 270, and the presentation of the ads by ad serving component 280. In addition, statistics engine 290 may log information about what happens with the advertisement once it has been provided to ad consumer 130. This includes information such as on what location the ad was provided, what the response was to the advertisement, what the effect was of the advertisement, etc.

Figure 3:
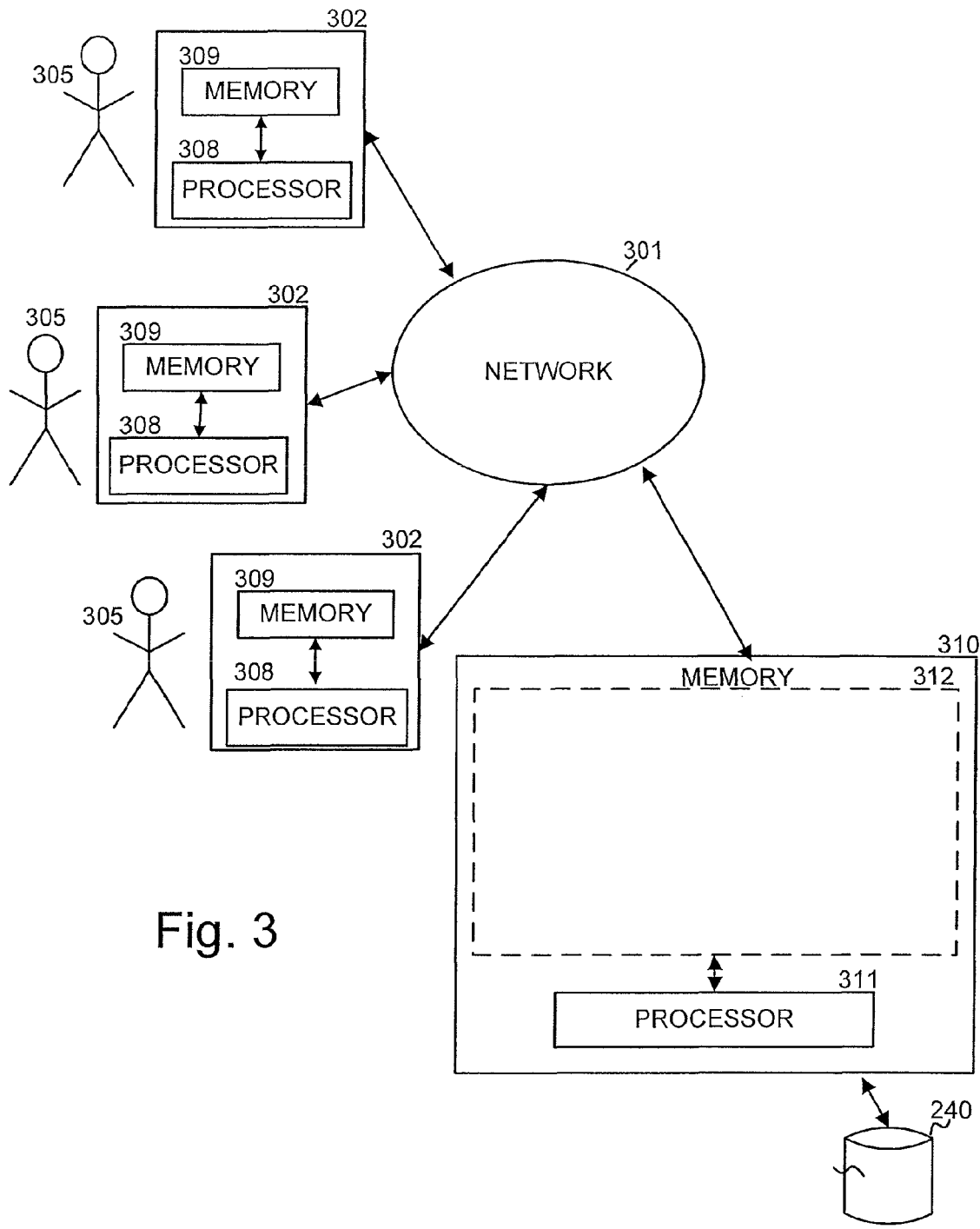
FIG. 3 is a diagram illustrating apparatus with which the invention may be implemented.

FIG. 3 is a diagram illustrating an architecture in which the present invention may be implemented. The architecture includes multiple client devices 302, a server device 310, and a network 301, which may be, for example, the Internet. Client devices 302 each include a computer-readable medium 309, such as random access memory, coupled to a processor 308. Processor 308 executes program instructions stored in memory 309. Client devices 302 may also include a number of additional external or internal devices, such as, without limitation, a mouse, a CD-ROM, a keyboard, and a display. Thus, as will be appreciated by those skilled in the art, the client devices may be personal computers, personal digital assistances, mobile phones, content players, etc.

Through client devices 302, requestors 305 can communicate over network 301 with each other and with other systems and devices coupled to network 301, such as server device 310. Requestors 305 may, for example, be advertisers 110, advertisement consumer 130, or advertising target 140.

Similar to client devices 302, server device 310 may include a processor 311 coupled to a computer readable memory 312. Server device 310 may additionally include a secondary storage element, such as a database 240.

Client processors 308 and server processor 311 can be any of a number of well known micro-processors, such as processors from Intel Corporation, of Santa Clara, Calif. In general, client device 302 may be any type of computing platform connected to a network and that interacts with application programs, such as a digital assistant or a "smart" cellular telephone or pager. Server 310, although depicted as a single computer system, may be implemented as a network of computer processors.

Memory 312 may contain a number of programs, such as the components described above in reference to FIG. 2.

B. Operation

Figure 4:
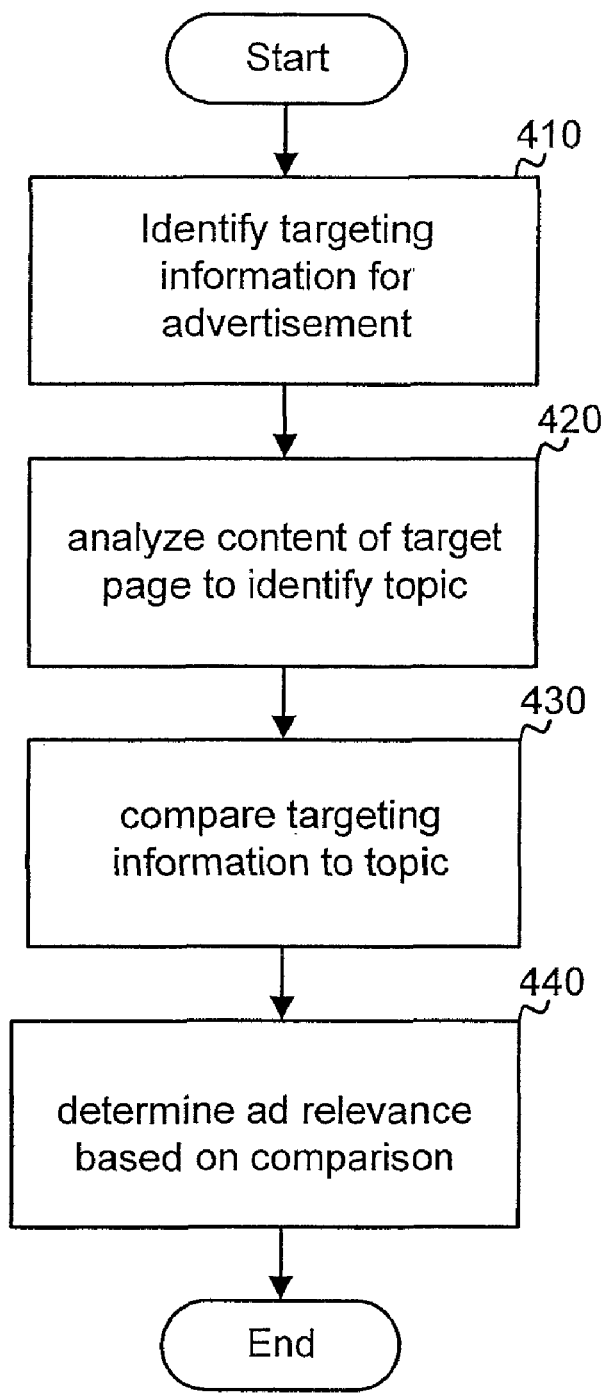
FIG. 4 is a flow diagram of an exemplary method for providing relevant advertisements, consistent with the present invention.

FIG. 4 is a flow diagram of an exemplary method for determining if an advertisement is relevant to a document, consistent with the present invention. As used herein, the term "document" includes any type of paper or electronic document or file, including audio, video, image, text, etc. That is, as will be appreciated by one skilled in the art, a "document" as used in the specification is any machine-readable and machine-storable work product. A document may be a file, a combination of files, one or more files with embedded links to other files, etc. For the sake of illustration, it may be understood that the process described herein takes place as part of the ad selection component 260, although those skilled in the art will recognize that it need not take place in that component alone.

The exemplary method is not limited by the order shown in the flow diagram. The process identifies targeting information for an advertisement. (Stage 410). The targeting information may be in the form of a list of keywords or phrases associated with the advertisement (e.g., "honda", "honda cars", "cars", etc.), as provided by advertiser 110 through ad campaign entry and management component 210. Alternatively, or in addition, the targeting information may be determined algorithmically, based on the content of the advertisement, the goods or services being advertised, the targeting of other related advertisements, etc. For example, if the content of the advertisement includes "Buy honda cars at the lowest prices of the year!", the terms "honda" or "honda cars" may be extracted from that content. The targeting information may also include other demographic information, such as geographic location, affluence, etc. Thus, the targeting information is simply some information from which a topic may be derived.

Next, the target document (i.e., the document corresponding to which a relevant advertisement is requested) is analyzed to identify a topic corresponding to that target document. (Stage 420). The target document may be stored on a database 240 or may be provided by ad consumer 130 via ad consumer interface component 250. There are numerous ways in which the target document may be analyzed to identify this topic, as described below in reference to FIG. 5 and related text.

The targeting information identified in stage 410 is compared to the one or more topics identified in stage 420 to determine if a match exists. (Stage 430). A "match" need not be an exact match. Instead, a match is an indication of a relatively high degree of similarly, and/or a predetermined (e.g., absolute) degree of similarity. If a match exists, the advertisement is determined to be relevant to the target document (stage 440) and may be provided to ad ordering component 270, for eventual provision to ad consumer 130 via ad consumer interface component 250.

Those skilled in the art will also recognize that the functions described in each stage are illustrative only, and are not intended to be limiting.

One way to identify a topic corresponding to the target document is by analyzing some or all text within the target document, which shall be illustrated in reference to FIG. 5. FIG. 5 shows a sample document, entitled "Travels in Italy", which contains a collection of travel-related information pertaining to Italy. The document text contains the term "restaurant" (appearing 20 times), "chianti" (appearing 10 times), and "the" (appearing 100 times). It could be determined that one or more of each term (word or phrase) that appears in the title of the target document corresponds to a topic of the target document. On this basis, the topics for this document may be "travels", "in", and/or "italy."

Alternatively, it could be determined that one or more of each term that appears in the body of the target document corresponds to a topic of the target document. In the simplest case, each term within the target document would be identified as a topic. A slightly more complex approach would be to identify a term as a topic if it appears in the target document more than N times, such as N=2 (and indeed such a threshold-based approach could be used whenever terms within text are being analyzed). Even more complex analysis could be performed, such as by using a term vector for the target document, which assigns weights to each term. For example, terms that appear frequently in the target document may be assigned a relatively higher weight than those that appear less frequently. And so the term "the" would have a higher weight than "restaurant", which would have a higher weight than "chianti".

In addition, the weighting could be adjusted to give higher weight to terms that appear less frequently in a collection, such as a collection to which the document belongs or the general collection of documents. For example, the term "chianti" does not appear very commonly across the general collection of documents and so its weight may be boosted. Conversely, the term "the" appears so frequently across a collection of documents that its weight may be reduced or eliminated altogether.

In any situation where terms within text are assigned weights or scores, those resulting scores may be used to determine which terms will be identified as topics for the target document. For example, it may be determined that only the top scoring term would constitute a topic for the target document. Alternatively, or in addition, it may be determined that the top Z terms (or a subset thereof) will constitute topics for the target document, with Z being some defined number.

Alternatively, or in addition, it may be determined that terms having a score that exceeds Y (or a subset thereof) will constitute topics for the target document, with Y being some defined number. Thus, as one skilled in the art will appreciate, topics may be determined based on absolute and/or relative criteria.

Alternatively, or in addition to using text or other information within the target document, meta-information associated with the target document may be used. For example, a reference to the target document by another document may contain a brief description of the target document. Assume a document called "Entertainment" that contains a reference to the target document and describes it as "For a description of restaurants and wine in Italy, see 'Travels in Italy'." In the context of a web page, this is often described as anchor text. One or more such brief descriptions may be used to revise (figuratively) the target document by supplementing or replacing some or all of its content with the brief descriptions. So, for example, the topic could be identified from the combination of the target document's title and the brief descriptions of the target document.

Alternatively, or in addition to the brief descriptions from these references, the references themselves may be used. For example, a reference from another document to the target document may be used as an indication that the two documents are similar. Alternatively, or in addition, a reference from the target document to another document may be used as an indication that the two documents are similar. So a reference between the "Entertainment" document and the "Travels in Italy" document may indicate that the two are related. In the context of web pages, these references occur in the form of links from one web page to another. On this basis, the content (or meta-information) of the other document may be used to revise (figuratively) the target document by supplementing or replacing its content with that of the other document. The revised target document's content may then be analyzed using the techniques described above to identify one or more topics.

Alternatively, or addition to using the content (including perhaps meta-data) associated with a target document, other techniques may be used to identify one or more topics for the target document. For example, the top N queries (or subset thereof) that result in a reference to the target document could be determined to constitute a topic for the target document, with N being some defined number. These may be, for example, text queries in a search engine that yield a result that links to the target document or web page. Alternatively, or in addition, the content of other similar documents (e.g., in the same collection as the target document, in the same category as the target document, etc.) may be used to revise (figuratively) the content of the target document. Any of the techniques described above may then be used to analyze the target document to identify one or more topics. In the context of web pages, this may be other web pages that are stored within a subdirectory of related pages on the same host as the target web page. Alternatively, or in addition, any technique for classifying the target document into a set of one or more topics or categories may be used. Even the search query history of one or more users who visit the target document (or target web page) may be used to identify a topic for the target document or web page, on the theory that a visit to the target document that is temporally proximate to that search query history indicates that the user thought the concepts were related. For example, if a user searched for "italian wine" and then soon afterwards visited the "Travels in Italy" document, the content of that prior search could be used to determine that "italian" and/or "wine" are potential topics for the "Travels in Italy" document.

Using one or more of the various techniques described above, or other techniques, one or more topics may be identified for the target document. Once these topics have been identified, a variety of techniques may be used to determine other topics that are related to those identified topics. For example, a thesaurus could be used to determine other topics (e.g., synonyms) that are closely related to the identified topics or that are conceptually similar to the identified topics.

For the sake of clarity, the foregoing references to "revising" the target document are a figurative aid in understanding the use of additional information that is not literally within the target document. Those skilled in the art will recognize that the target document need not be actually revised to make use of this additional information.

C. Conclusion

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

The scope of the invention is defined by the claims and their equivalents.

What is claimed:

1. A computer-implemented method comprising:
   a) determining, by a server system including at least one processor on a network, a set of one or more topics for a target document by calculating weighted terms for the target document based on text within the target document, wherein the set of one or more topics includes only a defined number of those of the weighted terms with the highest weights among the weighted terms;
   b) for each of a plurality of advertisements, determining, by the server system, whether the advertisement is relevant to the target document by analyzing a set of one or more topics of the advertisement, with respect to the set of one or more topics of the target document;
   c) for each of the plurality of advertisements, making a serving determination, by the server system, using at least the determination of whether or not the advertisement is relevant to the target document; and
   d) controlling, by the server system, serving of the advertisement for presentation to a user via a client device using the serving determination, wherein the act of calculating weighted terms for the target document based on text within the target document includes determining the weight of each of the weighted terms based on at least one of (A) a frequency with which the term appears in the text of the target document, or (B) an infrequency with which the term appears across a collection of documents.

2. The computer-implemented method of claim 1 wherein analyzing a set of one or more topics, previously provided from an advertiser as targeting information for the advertisement, with respect to the set of one or more topics of the target document, includes scoring a similarity between the set of one or more topics of the advertisement and the set of one or more topics of target document.

3. The computer-implemented method of claim 1 wherein the set of one or more topics previously provided from an advertiser as targeting information for the advertisement include at least one of (A) a keyword and (B) a phrase, and wherein the set of one or more topics previously provided from an advertiser as targeting information for the advertisement were received via an ad campaign entry and management component of the server system.

4. The computer-implemented method of claim 1 wherein the set of one or more topics of the target document further includes at least one topic from another document linked to the target document.

5. The computer-implemented method of claim 1 wherein the set of one or more topics of the target document further includes at least one topic from another document linked from the target document.

6. The computer-implemented method of claim 1 wherein the set of one or more topics of the target document further includes anchor text in a link from another document to the target document.

7. The computer-implemented method of claim 1 wherein the set of one or more topics of the target document further includes text from queries to a search engine that returned a search result including the target document.

8. The computer-implemented method of claim 1 wherein the set of one or more topics of the target document further includes text from queries to a search engine that returned a search result including the target document, which was subsequently selected by a user.

9. A computer-implemented method comprising:
　a) determining, by a server system including at least one processor on a network, a set of one or more topics for a target document by calculating weighted terms for the target document based on text within the target document, wherein the set of one or more topics contains only those of the weighted terms whose weight exceeds a defined threshold;
　b) for each of a plurality of advertisements, determining, by the server system, whether the advertisement is relevant to the target document by analyzing a set of one or more topics of the advertisement, with respect to the set of one or more topics of the target document;
　c) for each of the plurality of advertisements, making a serving determination, by the server system, using at least the determination of whether or not the advertisement is relevant to the target document; and
　d) controlling, by the server system, serving of the advertisement for presentation to a user via a client device using the serving determination,
　　wherein the act of calculating weighted terms for the target document based on text within the target document includes determining the weight of each of the weighted terms based on at least one of (A) a frequency with which the term appears in the text of the target document, or (B) an infrequency with which the term appears across a collection of documents.

* * * * *